United States Patent [19]
Hayashi

[11] 3,840,892
[45] Oct. 8, 1974

[54] METHOD AND DEVICE FOR DETECTING SIGNALS FROM MAGNETIC MEMORY

[75] Inventor: Yukitaka Hayashi, Hitachi, Japan
[73] Assignee: Hitachi, Ltd., Tokyo, Japan

[22] Filed: July 3, 1973
[21] Appl. No.: 376,179

[30] Foreign Application Priority Data
July 7, 1972 Japan .............................. 47-67503

[52] U.S. Cl. .................................... 360/53, 360/45
[51] Int. Cl. ........................................... G11b 5/44
[58] Field of Search .................... 360/41, 44, 45, 53

[56] References Cited
UNITED STATES PATENTS
3,551,886 12/1970 Cook ............................ 340/174.1 B
3,623,041 11/1971 MacDougall, Jr. .......... 340/174.1 H

*Primary Examiner*—Vincent P. Canney
*Attorney, Agent, or Firm*—Craig & Antonelli

[57] ABSTRACT

The peaks in the waveform of signal read out of a magnetic memory by a magnetic head are detected on the basis of a predetermined constant threshold level. In such detection, peak pulses having the same polarity are by no means detected sequentially in the correct detection. When two peak pulses of the same polarity are sequentially detected, a drop-out of a peak pulse having the opposite polarity to be detected earlier by 1 bit time than the last one of the two sequential peak pulses is determined, and a signal corresponding to the peak pulse dropped-out is added to output means including a compensation circuit so that a signal detection can be effected with a high reliability.

7 Claims, 7 Drawing Figures

PRIOR ART

PRIOR ART

METHOD AND DEVICE FOR DETECTING SIGNALS FROM MAGNETIC MEMORY

BACKGROUND OF THE INVENTION

1. Field of the Invention

The present invention relates to a method and device for detecting signals, which can be applied to a magnetic memory and especially to a magnetic drum memory or a magnetic disc memory having a high storage density.

2. Description of the Prior Art

In the case of a magnetic memory having a high storage density such as a magnetic rotating drum, the signal read out of the data track is generally asynchronous to a great extent with the so-called fixed clock signal due to the expansion, contraction or dislocation of the magnetic surface caused by the temperature difference between the writing and reading performances.

In order to prevent such asynchronism between the data and clock signals, the self-clocking method has been employed according to which the clock signal exactly synchronous with the data is derived from the data signal read out. Technique of phase modulation (PM) or frequency modulation (FM) is used for the self-clocking method.

However, the maximum frequency per bit of magnetization inversion of the FM or PM method is twice as high as that of the NRZ (Non Return to Zero) method and therefore the former method is not preferable for a storage device having a very high storage density more then, for example, 1,200 BPI (bits per inch).

In the conventional NRZ method, a timing signal could not be derived from each data bit so that the adoption of the self-clocking method was delayed. This problem has already been solved by the method disclosed in the U.S. Patent Application Ser. No. 287,639 specification titled "Clocking System for a Magnetic Memory" filed by the same applicant.

In order to realize the NRZ method having a storage density 1.5 to 2 times as high as that of the PM or FM method, however, another problem of the level fluctuation due to the interference between the adjacent signals read out must be solved.

On the other hand, in the NRZ method, peaks are detected by the use of a constant threshold level so as to prevent spurious operation owing to residual output near zero level and noise. If, therefore, any peak is rendered short of the level due to the interference less than the threshold level, i.e., a level-down is caused such that the peaks do not reach the threshold level, a peak itself can no longer be detected. Thus, this level-down forms a difficulty in increasing storage density.

SUMMARY OF THE INVENTION

The main object of the present invention is to provide a novel method and device for detecting signals adapted for the NRZ method with high storage density.

Another object of the present invention is to provide a novel method and device for detecting signals, according to which it is possible to logically compensate for the level-down due to the interference between the signals read out.

An additional object of the present invention is to provide a method and device for detecting signals, according to which the loss of peaks due to drop-outs and waveform distortions can be compensated.

The main feature of the present invention is that detecting means to detect two successive positive or negative peak pulses is provided so that the compensation of data is performed upon detection of the successive pulses.

Another feature of the present invention is that when two successive positive peak pulses are delivered, a piece of data in a position in the output data corresponding to a negative peak pulse to be detected earlier by 1 bit time than the last one of the two sequential positive peak pulses is corrected.

An additional feature of the present invention is that when two successive negative peak pulses are delivered, a piece of data in a position in the output data corresponding to a positive peak pulse to be detected earlier by 1 bit time than the last one of the two sequential negative peak pulses is corrected.

A yet another feature of the present invention is that a positive peak sequence detecting circuit is provided so that the data compensation is carried out depending upon the output of the detecting circuit.

A further feature of the present invention is that a negative peak sequence detecting circuit is provided so that the data compensation is carried out depending upon the output of the detecting circuit.

Yet an additional feature of the present invention is that when two peak pulses of the same polarity are successively detected while three read clock pulses for signal detection are counted, a piece of data in a position in the output data corresponding to a peak pulse having the opposite polarity to be detected earlier by 1 bit time than the last one of the two sequential peak pulses is corrected.

A still further feature of the present invention is the provision of a first, a second and a third flipflop which is used as output means, the first flip-flop being set each time peak pulses are detected and reset by the read clock pulses;, the second flip-flop having its setting and resetting conditions depending upon the output of the first flip-flop and being set when peak pulses having the same polarity are sequentially received; and the third output flip-flop having its setting and resetting conditions depending upon the output of the second flip-flop.

Other objects and features of the present invention will be apparent when the following description of the specification is read with the aid of the attached drawings.

DESCRIPTION OF THE PREFERRED EMBODIMENT

For the purpose of facilitating the understanding of the present invention, an explanation will first be made of the prior art with the aid of FIGS. 1 to 3.

Figure 1A:
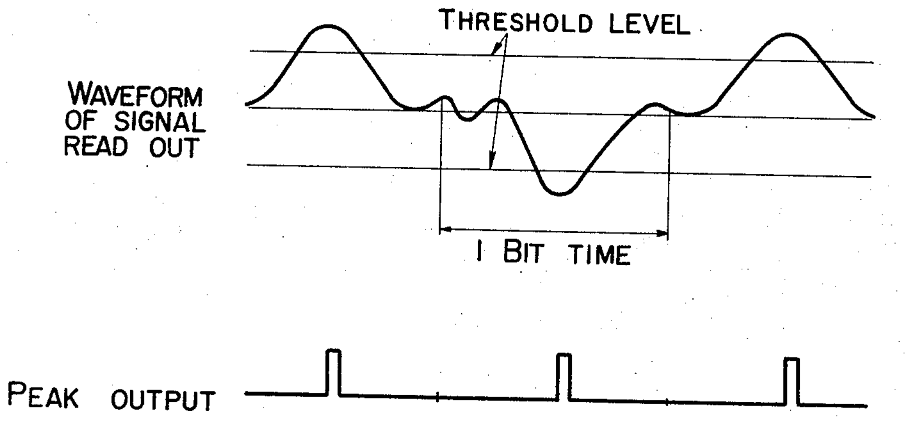
FIG. 1a PRIOR ART
FIGS. 1*a* and 1*b* are the graphs of the signal waveforms, which illustrate how the output level is affected by an interference between signals read out.
Figure 1B:
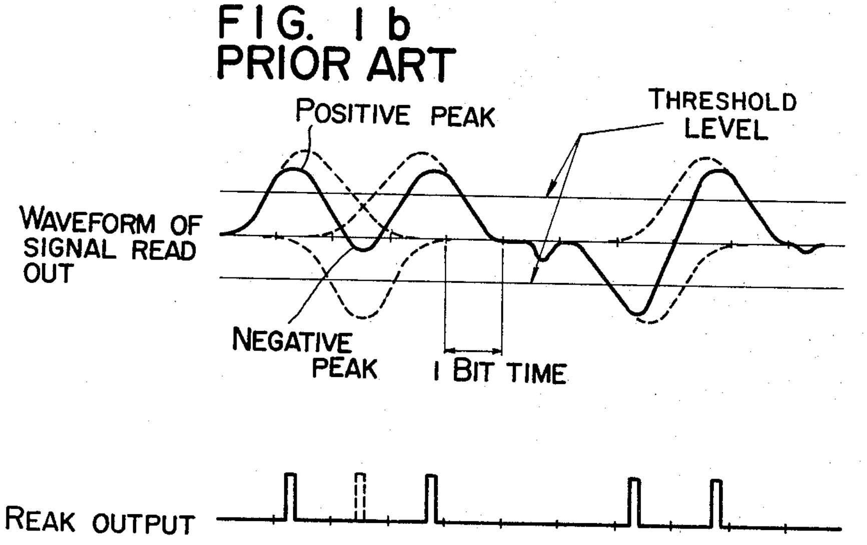
FIG. 1b PRIOR ART

FIGS. 1*a* and 1*b* respectively show how the output level is changed due to the interference between the signals read out, in the case of low density storage and in the case of high density storage.

In the case of FIG. 1*a*, corresponding to the low density storage, where the change in the waveform of each signal read out is generally slow enough within a single bit time, there is no interference between the signal waveforms and therefore no variation of the level.

On the other hand, in the case of FIG. 1*b*, where the spread of the waveform of each read-out signal is not so large as compared with a single bit time, some of the respective waveforms of the read-out signals, i.e., separate waveforms designated by dotted lines, are superposed upon one another to form a continuous waveform designated by a solid line. Namely, as a result of the interference, the resultant peak, in this Figure the negative peak, does not reach the corresponding threshold level so that it cannot be detected as a peak pulse resulting in a malfunction of the signal detection. As is apparent from the foregoing description, the level of the peak of the resultant waveform will be decreased as the density of storage is increased.

Figure 2:
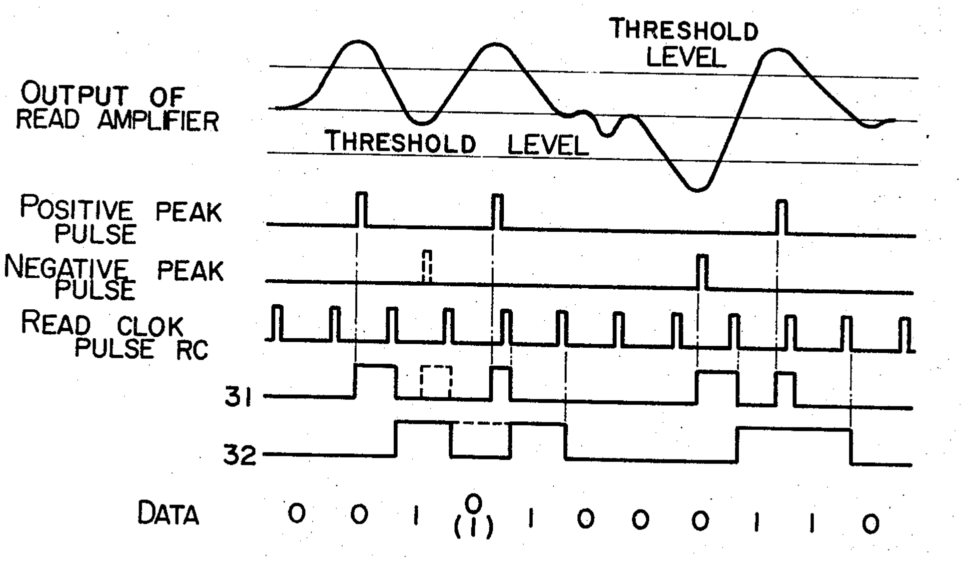
FIG. 2 PRIOR ART
FIG. 2 is a time chart for the circuit of a conventional demodulator.
Figure 3:
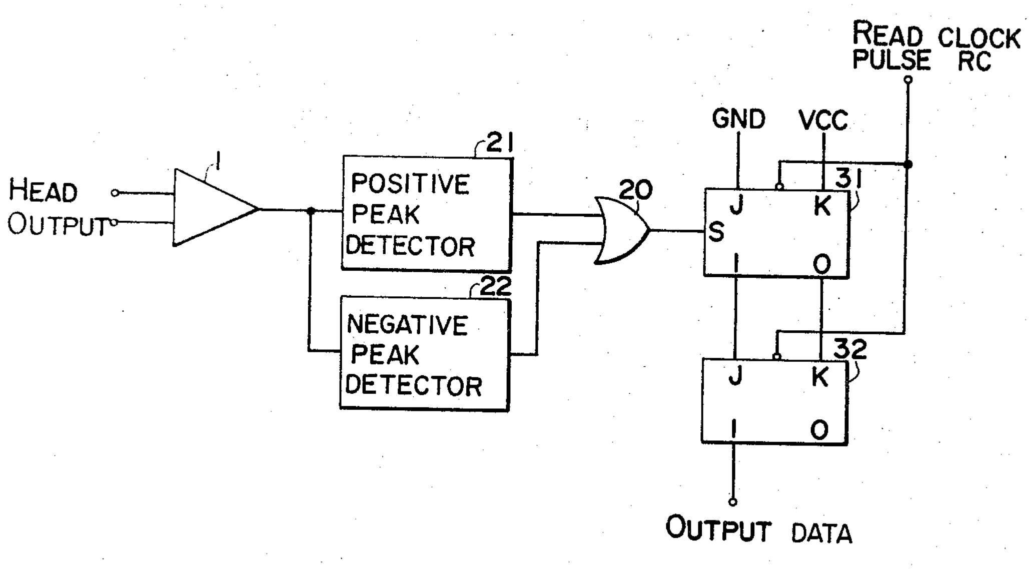
FIG. 3 PRIOR ART
FIG. 3 shows a circuit of a conventional demodulator.

The read out or reproduced waveforms as shown in FIG. 1 are demodulated into data through a demodulator circuit as shown in FIG. 3, according to a time chart as shown in FIG. 2.

Now, reference should be had to FIG. 3. A read amplifier 1 serves to amplify the read-out signals from a magnetic head (not shown). A positive peak detector 21 and a negative peak detector 22 receive an output from the read amplifier 1 and detect respectively positive and negative peaks of the output signal on the basis of a predetermined constant threshold level. An OR gate 20 receives the positive and the negative pulses from the positive and the negative peak detectors 21 and 22 and delivers an output to the set terminal S of a flip-flop 31. The terminal J of the flip-flop 31 is grounded while the terminal K is connected with a constant voltage VCC. As seen from FIG. 2, the flip-flop 31 is set by the leading edge of each positive peak pulse or negative peak pulse and reset by the trailing edge of each read clock pulse RC. The output of the flip-flop 31, i.e., a constant level signal, is transferred to a flip-flop 32 simultaneously with the reset of the flip-flop 31. The flip-flop 32 has its terminals J and K connected respectively with the set output terminal 1 and the reset output terminal 0 of the flip-flop 31. The flip-flop 32 is set by the trailing edge of the read clock pulse RC when the flip-flop 31 is in its set condition but is reset by the trailing edge of the read clock pulse RC when the flip-flop 31 is in its reset condition. Due to the action of the flip-flop 32, the output data becomes NRZ data which is obtained by being inverted in response to the trailing edge of the read clock pulse RC, as seen from FIG. 2. In FIG. 2 is shown a negative peak pulse with dotted line, which corresponds to a peak falling short of the threshold level since the peak is somewhat leveled down due to the interference between the waveforms read out and which could not be detected, as described with FIG. 1. If the negative peak pulse represented in FIG. 2 by the dotted line is lost, the corresponding parts in the output waveforms of the flip-flops 31 and 32, indicated by dotted line, will be lost. Accordingly, a piece of information 1 drops out of the original data "0011100 . . . . ." so that a wrong data "0010100 . . . . ." will be reproduced. The present invention has been made just to solve this problem of such pulse drop-out.

Figure 4:
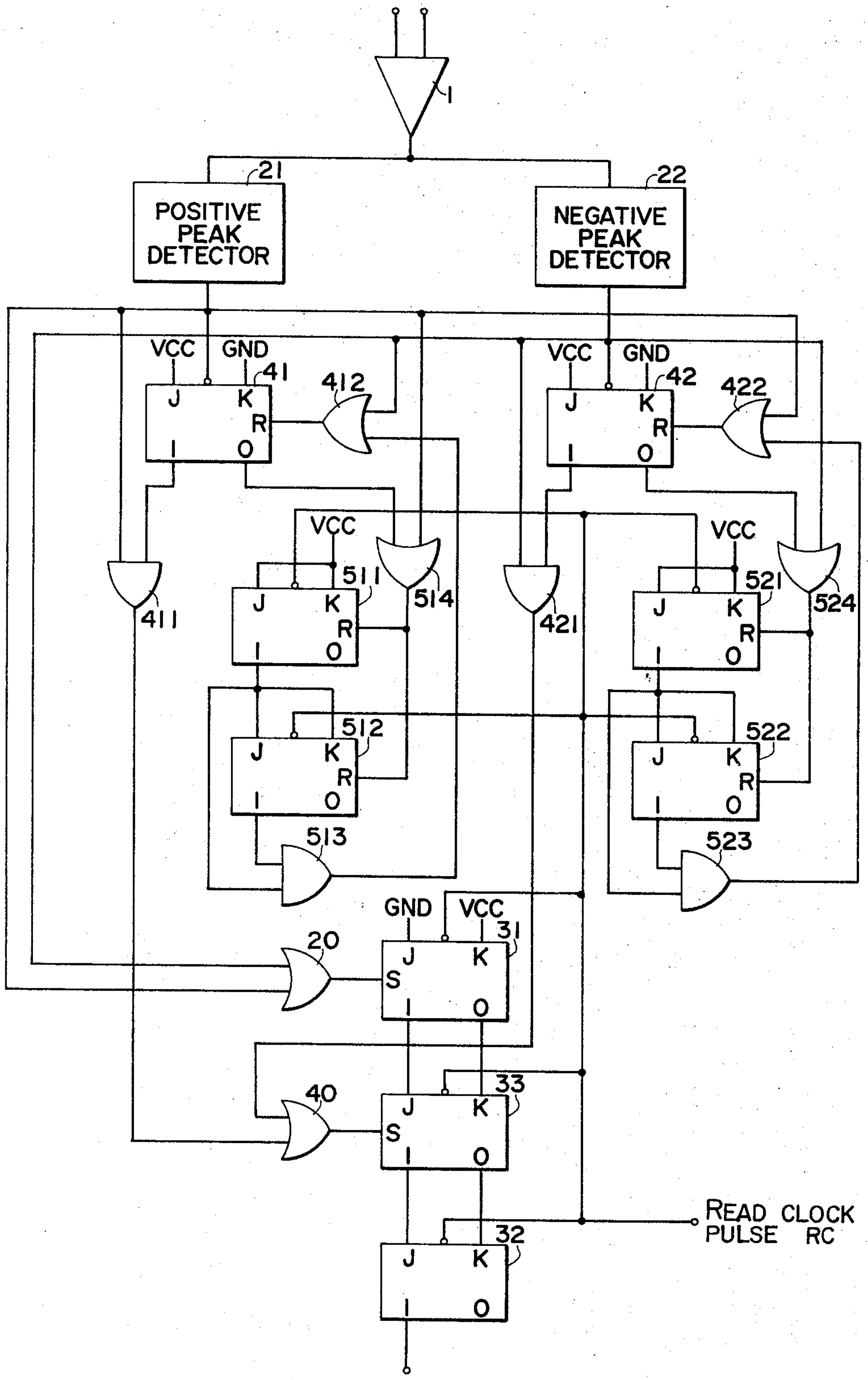
FIG. 4 shows a circuit of a device embodying the method according to the present invention.

Before the description of a circuit shown in FIG. 4, the principle of the present invention will be explained with the aid of the waveforms in FIG. 5.

Figure 5:
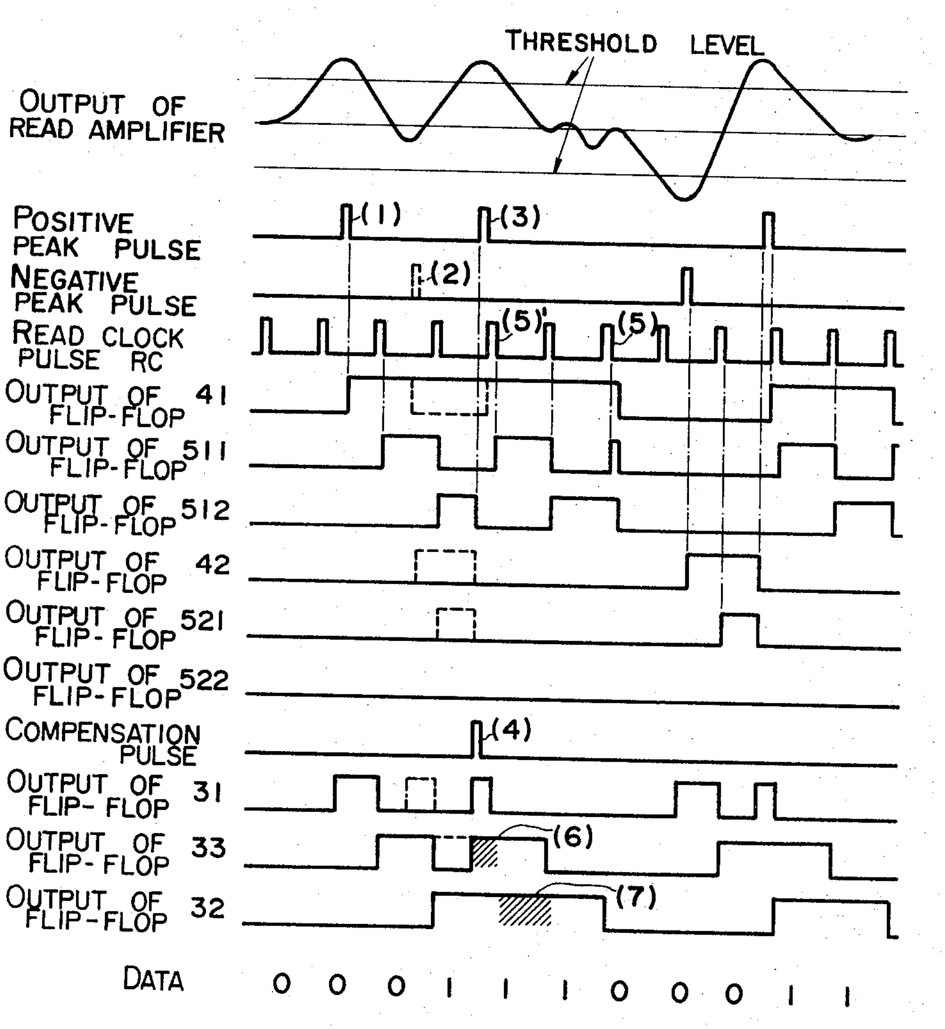
FIG. 5 is a time chart necessary for the explanation of the operation of the device shown in FIG. 4.

If a negative peak pulse (2) represented in FIG. 5 by dotted line is lost, a positive peak pulse (3) is to be detected after the detection of a positive peak pulse (1). Namely, if the negative peak pulse is lost, the two positive peak pulses are successively detected. The present invention utilizes this fact. According to the present invention, when the two positive peak pulses are successively detected due to the drop-out of the negative peak pulse, a piece of data in the a position in output data corresponding to a negative peak pulse to be detected earlier by 1 bit time than the second positive peak pulse is corrected so that the drop-out of the negative peak pulse is compensated.

On the other hand, if a positive peak pulse is lost, two negative peak pulses are to be detected successively. Therefore, when the second negative peak pulse is detected, a piece of data in a position in the output data corresponding to the positive peak pulse to be detected earlier by 1 bit time than the second negative peak pulse is corrected so that the drop-out of the positive peak pulse is compensated. However, it is impossible to trace back the lapse of time equal to 1 bit time. Therefore, the present invention employs a third flip-flop 33 for compensation, inserted between the flip-flops 31 and 32 shown in FIG. 3 so that the correct output data can be obtained from the output flip-flop 32 by the help of the flip-flop 33.

Now, an example of the method of recovering the lost data will be described with the aid of FIGS. 4 and 5. In FIG. 4, the same reference numerals as in FIG. 3 designate like parts or elements. A flip-flop 41 is provided for positive compensation and includes a terminal J connected with a constant voltage VCC, a terminal K connected with the earth GND, a trigger terminal connected with a positive peak detector 21, and a reset terminal R connected with a negative peak detector 22 via an OR gate 412 flip-flop 41 and is set by the trailing edge of a positive peak pulse and reset by the leading edge of a negative peak pulse. Under normal condition, therefore, because positive peak pulses never appear successively the output of the positive compensation flip-flop 41 and a positive peak pulse cannot be simultaneously applied to an AND gate 411. Therefore, no output, i.e. positive compensation pulse, is delivered from the AND gate 411. However, if a negative peak pulse (2) represented in FIG. 5 by dotted line is lost, then the flip-flop 41 is not reset, remaining in its set condition, and a positive peak pulse (3) is detected after a positive peak pulse (1) so that the AND gate 411 is actuated by the positive peak pulse (3) and the output of the flip-flop 41 to deliver an output as a positive compensation pulse (4) shown in FIG. 5. The positive compensation pulse (4) sets a compensation flip-flop 33, through an OR gate 40 so that a piece of data lost due to the drop-out of the negative peak pulse (2) is recovered.

The positive compensation flip-flop 41 and the AND gate 411 serves in combination to detect a sequence of positive peak pulses and accordingly the combination of the flip-flop 41 and the AND gate 411 and hereafter referred to as a positive peak sequence detector circuit.

Flip-flops 511 and 512 are so designated as to form a scale-of-three counter for the read clock pulses RC. The set output terminals of the flip-flops 511 and 512 are connected with the reset terminal R of the positive compensation flip-flop 41 through an AND gate 513 and the OR gate 412 so that the flip-flop 41 may be reset in an appropriate time even if no negative peak pulse is received. Namely, the positive compensation pulse is generated only by the logical product of the output of the positive compensation flip-flop 41 and that positive peak pulse which is the last one of the successive positive, negative and positive pulses, only if the intermediate negative peak pulse is lost. No logical product is formed between the output of the flip-flop 41 and any other positive peak pulse detected later than the above mentioned last pulse. This means, as seen from the waveform of the output of the flip-flop 41 in FIG. 5, that the flip-flop 41 should be reset by the trailing edge of the read clock pulse (5) which is a third one of the successive read clock pulses received after the flip-flop 41 is set by the positive peak pulse (3). The reset output of the flip-flop 41 is applied through an OR gate 514 to the reset terminals R of the flip-flops 511 and 512 so that while the flip-flop 41 is in its reset state, the flip-flops 511 and 512 are both in their reset states due to the function of the OR gate 514.

The flip-flops 511 and 512 are so designed that while the flip-flop 41 is in its set state the output of the former 511 is inverted by the trailing edge of each read clock pulse and that while the flip-flop 41 is in its set state the output of the latter 512 is inverted by the trailing edges of the read clock pulses which appear only while the output of the former 511 is 1. Accordingly, as seen from the waveform of the outputs of the flip-flops 511 and 512 in FIG. 5, the output of the flip-flop 511 is turned to 1 by the trailing edge of the above mentioned third read clock pulse (5) and the outputs of the flip-flops 511 and 512 are both 1 so that the AND gate 513 delivers an output to reset the flip-flop 41 through the OR gate 412. As soon as the flip-flop 41 has been reset, the flip-flops 511 and 512 are also reset.

Figure 6:
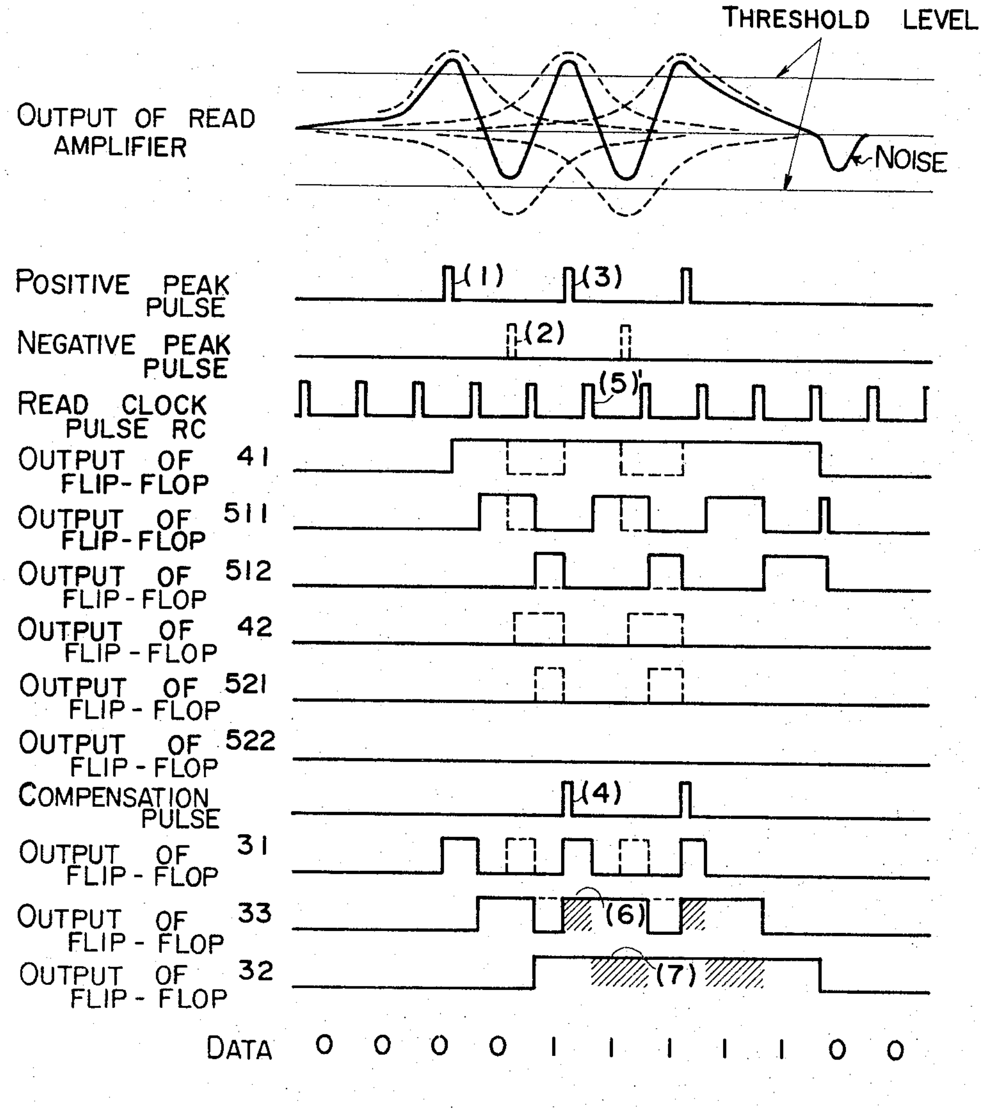
FIG. 6 is another time chart serving to facilitate the understanding of the function of the device according to the present invention.

If, however, the negative peak pulse (2) is lost after the flip-flop 41 is set by the first positive peak pulse (1) and if the positive peak pulse (3) is detected immediately before the flip-flop 41 is reset by the third read clock pulse (5)', then the flip-flop 41 remains in its set state also as seen from the output waveform of the flip-flop 41 in FIG. 5. Namely, since the positive peak pulse (3) resets the flip-flops 511 and 512 through the OR gate 514, the flip-flop 41 remains in its set state and is reset only by the trailing edge of the read clock pulse (5) which is a third one of the successive read clock pulses received after the positive peak pulse (3) is detected, in order to compensate for the drop-out of the next negative peak pulse that may occur. With this circuit design, the compensation for the drop-out of the successive two negative peak pulses can be effected in the case of a pulse sequence such as positive, negative, positive, negative and positive pulses, as shown in FIG. 6.

A negative compensation flip-flop 42 together with an AND gate 421 constitute a negative peak sequence detector circuit which serves to detect the coming of more than two sequential negative peak pulses. The constituent elements 42, 421, 422, 521, 522, 523 and 524 have the same functions with respect to the negative and positive pulses as the elements 41, 411, 412, 511, 512, 513 and 514 have with respect to the positive and negative pulses, respectively. And the explanation of their functions and operations will be omitted here.

The compensation flip-flop 33 is so designed that the setting and resetting thereof depends upon the output of the flip-flop 31 and that it is set when peak pulses of the same polarity appear sequentially, that is, when there is an output of the positive or negative peak sequence detector circuit.

The output flip-flop 32 is so designed that the setting and resetting thereof depends upon the output of the compensation flip-flop 33, and the fact that the flip-flop 33 is set by the output of the positive or negative peak sequence detector circuit means the recovery of a piece of data corresponding to a lost positive or negative peak pulse. Namely, the recovered data (6) shown by hatching on the output waveform of the flip-flop 33 in FIG. 5 is delivered as NRZ data containing correction shown at (7) by hatching on the waveform of the output of the flip-flop 32, by means of the flip-flop 32.

The notable difference between FIGS. 2 and 5 is that the hatched area exists in the waveform of the output of the output flip-flop 32.

The foregoing description has been made only of the method of compensation, according to the present invention, for the drop-out of peak pulses due to the level-down caused through the interference between the reproduced signals in the case of high density storage. However, it can be easily understood that according to the present method of compensation a drop-out of peak pulse due to the irregularity of magnetic surface, and distortion in waveform caused by temperature variation or mechanical vibration can also be compensated if the lost peak pulse is the middle one of three successive peak pulses.

The present method can compensate for the level-down due to that interference between the reproduced data signals (known as Pattern Effect) which is an obstacle to the high density storage in a magnetic memory, so that the density of storage can be increased by about 30 percent as compared with the conventional NRZ method.

Moreover, according to the present invention, the slice level for peak detection can set higher so that signal-to-noise ratio can be increased by about 30 percent as compared with the conventional NRZ method with the result that the reliability of the magnetic memory used can be increased.

I claim:

1. A method of detecting signals from a magnetic memory in which peaks of the waveform of signals read out of the memory by a magnetic head are detected with reference to a constant threshold level, wherein when a sequence of two peak pulses having the same polarity are detected, a signal corresponding to a peak pulse having the opposite polarity to be detected earlier by 1 bit time than the last one of the two sequential peak pulses is added to output means including a compensation circuit.

2. A device for detecting signals from a magnetic memory in which peaks of the waveform signals read out of the memory by a magnetic head are detected with reference to a constant threshold level and in which when a sequence of two peak pulses having the same polarity are detected, a signal corresponding to a peak pulse having the opposite polarity to be detected earlier by 1 bit time than the last one of the two sequential peak pulses is added to output means including a compensation circuit, the device comprising a positive peak sequence detector to detect a sequence of two positive peak pulses, a negative peak sequence detector to detect a sequence of two negative peak pulses, and means for effecting the addition of the signal by receiving an output of either one of said positive and negative peak sequence detectors.

3. A device as claimed in claim 2, wherein said positive peak sequence detector consists of a first flip-flop which is set by a positive peak pulse and reset by a negative peak pulse and an AND gate to make the logical product of a positive peak pulse and the output of said first flip-flop and wherein said negative peak sequence detector consists of a second flip-flop which is set by a negative peak pulse and reset by a positive peak pulse and an AND gate to make the logical product of a negative peak pulse and the output of said second flip-flop.

4. A device as claimed in claim 3, wherein first and second scale-of-three counters each to count read clock pulses for signal detection are further provided in association with the respective first and second flip-flops and wherein said first and second flip-flops are reset each time said associated counters count every three read clock pulses, respectively.

5. A device as claimed in claim 4, wherein said associated scale-of-three counters are reset when said first and second flip-flops of said positive and negative peak sequence detectors are in their reset states or when positive and negative peak pulse are detected, respectively.

6. A device for detecting signals from a magnetic memory in which peaks of the waveform signals read out of the memory by a magnetic head are detected with reference to a constant threshold level and in which when a sequence of two peak pulses having the same polarity are detected, a signal corresponding to a peak pulse having the opposite polarity to be detected earlier by 1 bit time than the last one of the two sequential peak pulses is added to output means including a compensation circuit, the device comprising a first flip-flop which is set each time a peak pulse is detected and reset by a read clock pulse, a second flip-flop for output adjustment and a third flip-flop for compensation inserted between said first and second flip-flops, the setting and resetting condition of which are affected by the output of said first flip-flop and which is reset when a sequence of peak pulses having the same polarity are detected, wherein said addition of the signal is effected through control of the set and reset conditions of said second flip-flop by the output of said third flip-flop.

7. A device for detecting signals from a magnetic memory in which peaks of the waveform signals read out of the memory by a magnetic head are detected with reference to a constant threshold level and in which when a sequence of two peak pulses having the same polarity are detected, a signal corresponding to a peak pulse having the opposite polarity to be detected earlier by 1 bit time than the last one of the two sequential peak pulses is added to output means including a compensation circuit, the device comprising a positive and a negative peak detectors which detect the positive and negative peaks of the waveform of the signals read out from said magnetic memory by said magnetic head with reference to a constant threshold level 1 positive and negative peak sequence detectors which respectively detect two successive positive peak pulses and two successive negative peak pulses generated while three read clock pulses are counted; a first flip-flop which is set by the output of either one of said positive and negative peak detectors and reset by the read clock pulses; a compensation flip-flop whose setting and resetting conditions are affected by the output of said first flip-flop and which is set by the output of either one of said positive and negative peak sequence detectors; and an output flip-flop whose setting and resetting conditions are affected by the output of said compensation flip-flop, wherein the signal detection is performed in dependence upon the change in the output of said output flip-flop.

* * * * *